US007701534B2

(12) United States Patent
Lee et al.

(10) Patent No.: US 7,701,534 B2
(45) Date of Patent: Apr. 20, 2010

(54) DISPLAY PANEL AND METHOD OF FABRICATING THE SAME

(75) Inventors: Jeong-Ho Lee, Seoul (KR); Jang-Soo Kim, Yongin-si (KR); Doo-Hwan You, Gwangmyung-si (KR); Young-Je Cho, Cheonan-si (KR); In-Ho Park, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 11/932,680

(22) Filed: Oct. 31, 2007

(65) Prior Publication Data
US 2008/0111957 A1 May 15, 2008

(30) Foreign Application Priority Data
Nov. 9, 2006 (KR) ............... 10-2006-0110624

(51) Int. Cl.
*G02F 1/1333* (2006.01)
*G02F 1/1335* (2006.01)
*G02F 1/1343* (2006.01)

(52) U.S. Cl. ............... 349/110; 349/56; 349/104; 349/106; 349/143; 349/146

(58) Field of Classification Search ............... 349/110
See application file for complete search history.

(56) References Cited

U.S. PATENT DOCUMENTS 5,194,976 A * 3/1993 Nakano et al. ............... 349/138
6,853,416 B2 * 2/2005 Hamamoto et al. ......... 349/106

* cited by examiner

*Primary Examiner*—Frank G Font
*Assistant Examiner*—Mary A El Shammaa
(74) *Attorney, Agent, or Firm*—Cantor Colburn LLP

(57) ABSTRACT

A display panel includes an opposite substrate and an array substrate, the array substrate includes a first base substrate, a plurality of pixels and a color filter. The opposite substrate includes a second base substrate, a first black matrix and a second black matrix. The first black matrix maintains an interval between the second base substrate and the array substrate, and the first black matrix is formed to correspond to a display area to block light. The second black matrix includes a first area and a second area. The first area surrounds the color filter and the second area surrounds the first area. The second area includes a height different from a height of the first area when viewed in a plan view.

19 Claims, 6 Drawing Sheets

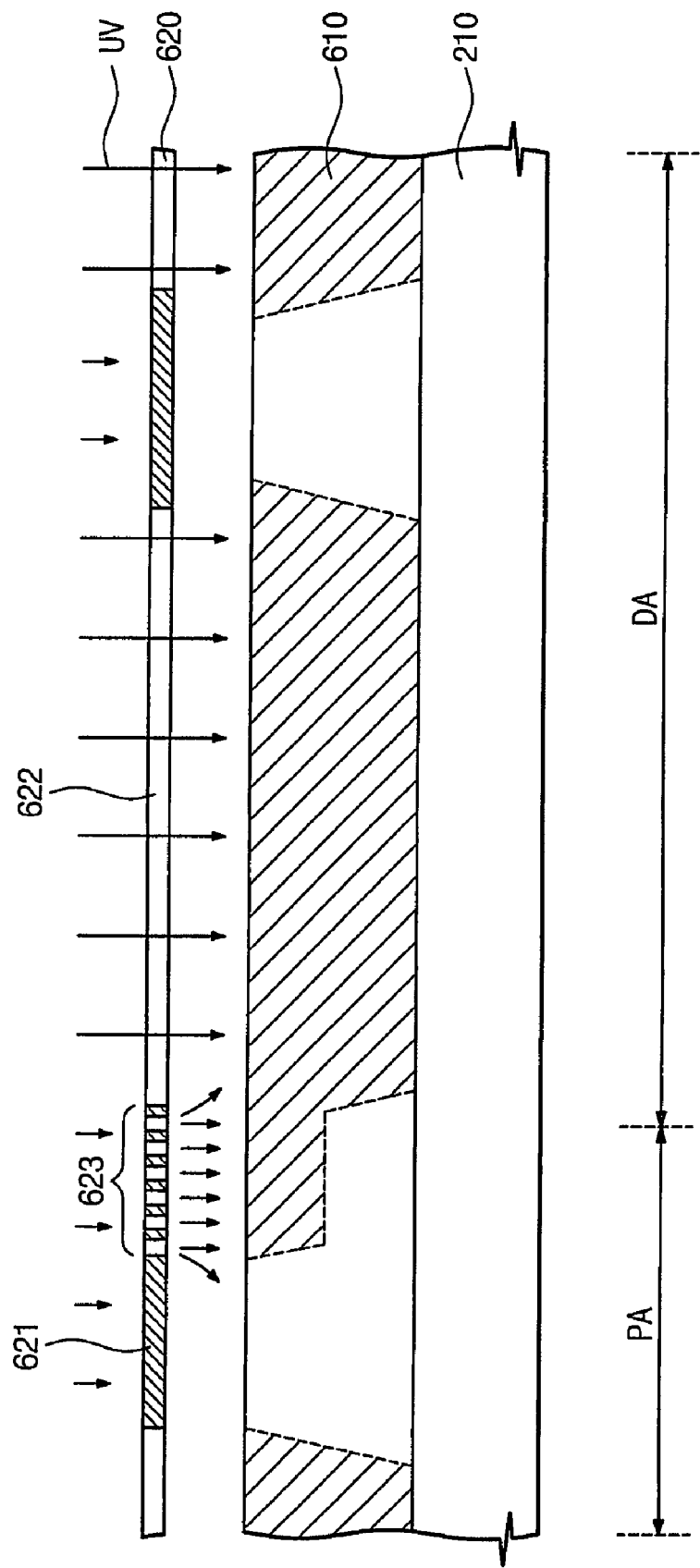

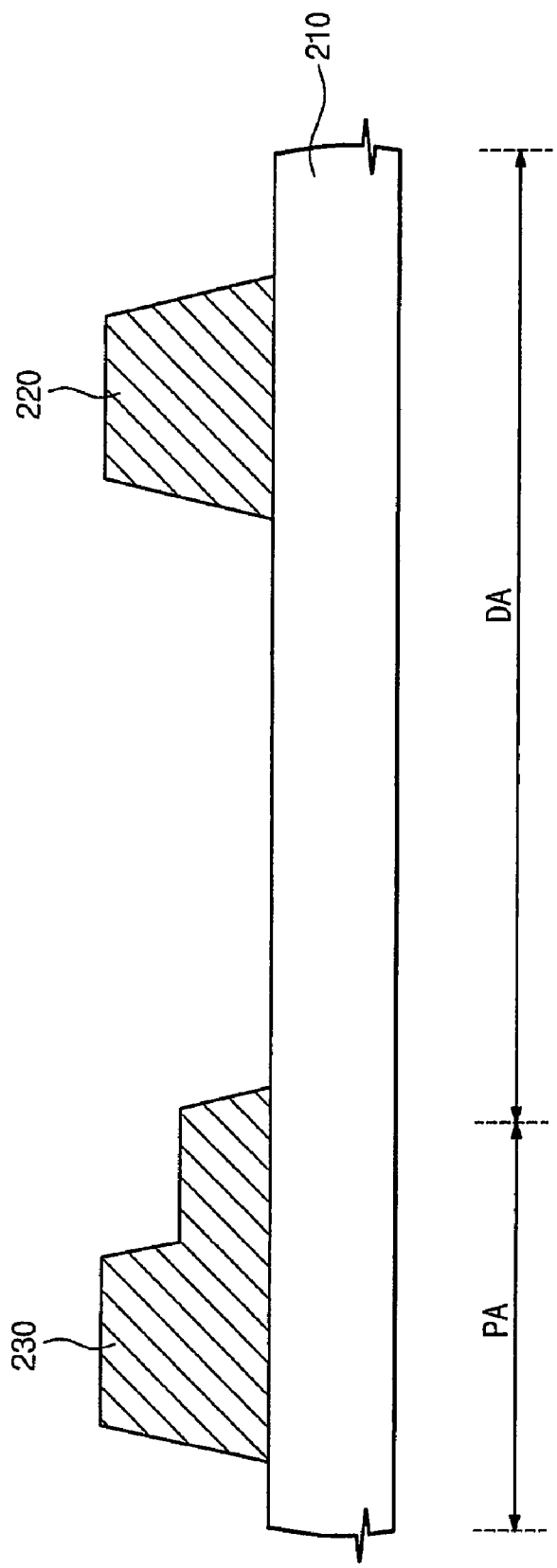

DISPLAY PANEL AND METHOD OF FABRICATING THE SAME

This application claims priority to Korean Patent Application No. 2006-110624, filed on Nov. 9, 2006, and all the benefits accruing therefrom under 35 U.S.C §119, the contents of which in its entirety are herein incorporated by reference.

BACKGROUND OF THE INVENTION

1. Field of the Invention

The present invention relates to a display panel. More particularly, the present invention relates to a display panel capable of simplifying process steps.

2. Description of the Related Art

Generally, a liquid crystal display ("LCD") includes an LCD panel to display an image and a backlight assembly to provide light to the LCD panel.

The LCD panel includes an array substrate, a color filter substrate which faces the array substrate and a liquid crystal layer interposed between the array substrate and the color filter substrate. The array substrate includes a plurality of pixels that serve as basic elements used to represent an image. Each pixel includes a thin film transistor ("TFT") and a pixel electrode. The TFT switches a pixel voltage applied to the liquid crystal layer. The pixel electrode is electrically connected to a drain electrode of the TFT, and faces a common electrode which is formed on a color filter substrate. The liquid crystal layer is interposed between the pixel electrode and the common electrode. Meanwhile, a color filter layer formed on the color filter substrate includes a plurality of color pixels, and each color pixel is provided to correspond to each pixel in order to display an image.

The LCD is fabricated in a slimmer size as compared to a cathode ray tube display, but the LCD has a narrower viewing angle.

Therefore, in order to improve the narrow viewing angle of the LCD, a patterned vertical alignment ("PVA") mode LCD panel and a super-patterned vertical alignment ("SPVA") mode LCD panel, which each have a relatively wider viewing angle characteristics, have been recently developed. In the PVA and SPVA mode LCD panels, a pixel electrode and a common electrode are patterned to thereby form a plurality of domains in one pixel. In addition, the liquid crystal molecules of the liquid crystal layer are aligned differently according to each domain.

Since the PVA and SPVA mode LCD panels are provided with openings formed through the common electrode in order to define the domains, a mask used to pattern the common electrode is required. For this reason, a number of process steps and a number of masks increase, thereby reducing a productivity and increasing manufacturing costs thereof.

BRIEF SUMMARY OF THE INVENTION

Therefore, the present invention provides a display panel capable of reducing process steps and improving a yield rate of a product.

In one exemplary embodiment of the present invention, a display panel includes an opposite substrate and an array substrate.

The array substrate includes a first base substrate, a plurality of pixels and a color filter. The first base substrate includes a display area and a peripheral area surrounding the display area. The display area and the peripheral area define the first base substrate, which faces the opposite substrate. A plurality of pixels are disposed in the display area to display an image. A color filter is disposed in the display area to realize a predetermined color by using light. The opposite substrate includes a second base substrate and first and second black matrices. The second base substrate faces the first base substrate. The first black matrix is interposed between the second base substrate and the array substrate, the first black matrix maintains an interval between the second base substrate and the array substrate, and the first black matrix is disposed to correspond to the display area to block the light. The second black matrix is disposed on the second base substrate to correspond to the peripheral area to block the light. The second black matrix includes a first area and a second area, the first area surrounds the color filter, and the second area surrounds the first area. The second area includes a height different from a height of the first area, when viewed in a plan view.

The first area of the second black matrix includes a first height, and the second area of the second black matrix includes a second height larger than the first height. The first black matrix has the second height of the second black matrix, and the first black matrix makes contact with the array substrate.

The display panel further includes a liquid crystal layer and a coupling member. The liquid crystal layer is interposed between the array substrate and the opposite substrate, and the liquid crystal layer adjusts a transmittance of light according to an intensity of an electric field generated between the array substrate and the opposite substrate. The coupling member is interposed between the array substrate and the opposite substrate while surrounding the liquid crystal layer, and the coupling member seals the liquid crystal layer.

According to the above, a cell gap between the array substrate and the opposite substrate is maintained by the first and second black matrices. Thus, an additional spacer is not required, and the second black matrix impedes a flow of the liquid crystal layer into the coupling member. Therefore, process steps and manufacturing costs for the display panel are reduced, and a productivity and display quality may also be improved.

BRIEF DESCRIPTION OF THE DRAWINGS

The above and other aspects, features and advantages of the present invention will become readily apparent by reference to the following detailed description when considered in conjunction with the accompanying drawings, in which:

FIGS. 5A and 5B are cross-sectional schematic diagram views illustrating process steps of fabricating the first and second black matrices illustrated in FIG. 2.

DETAILED DESCRIPTION OF THE INVENTION

Figure 1:
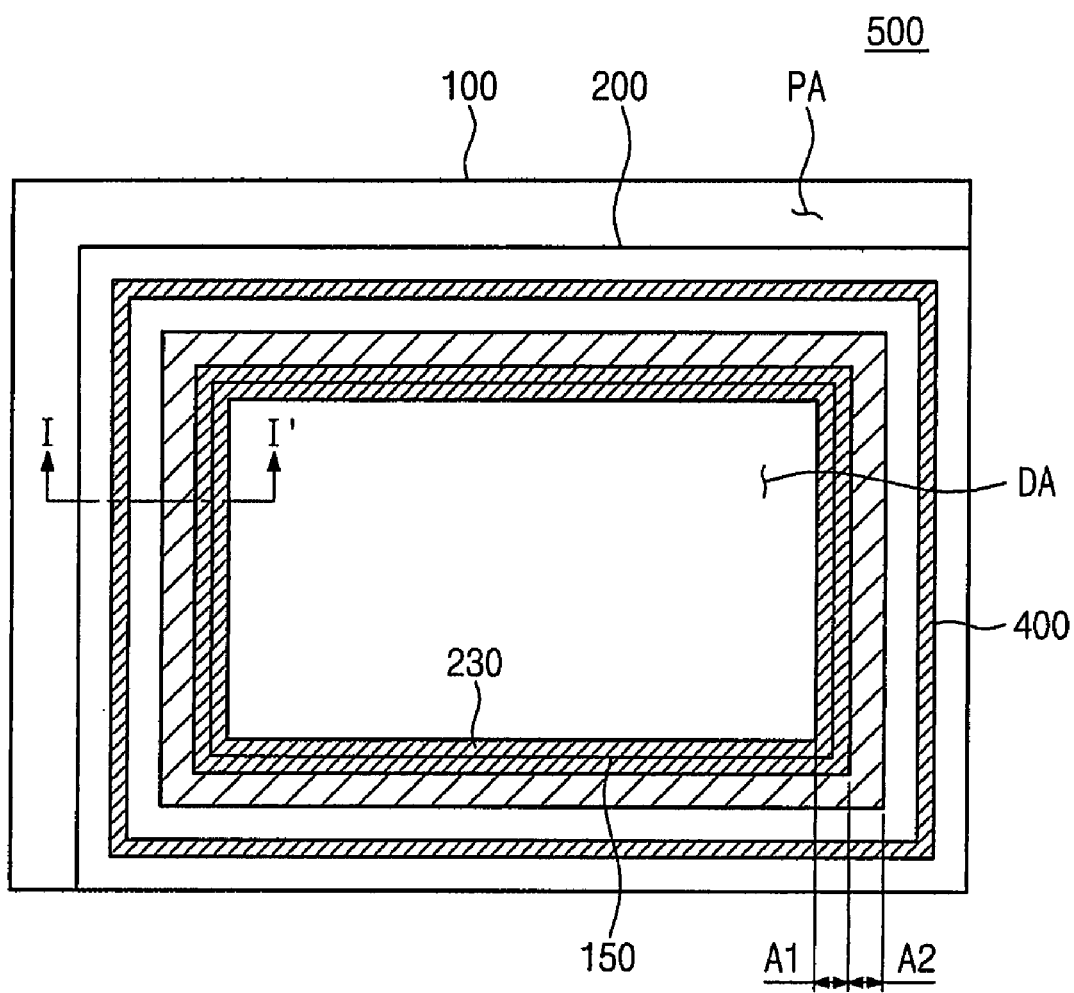
FIG. 1 is a top plan schematic diagram view illustrating an exemplary embodiment of a liquid crystal display ("LCD") panel according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
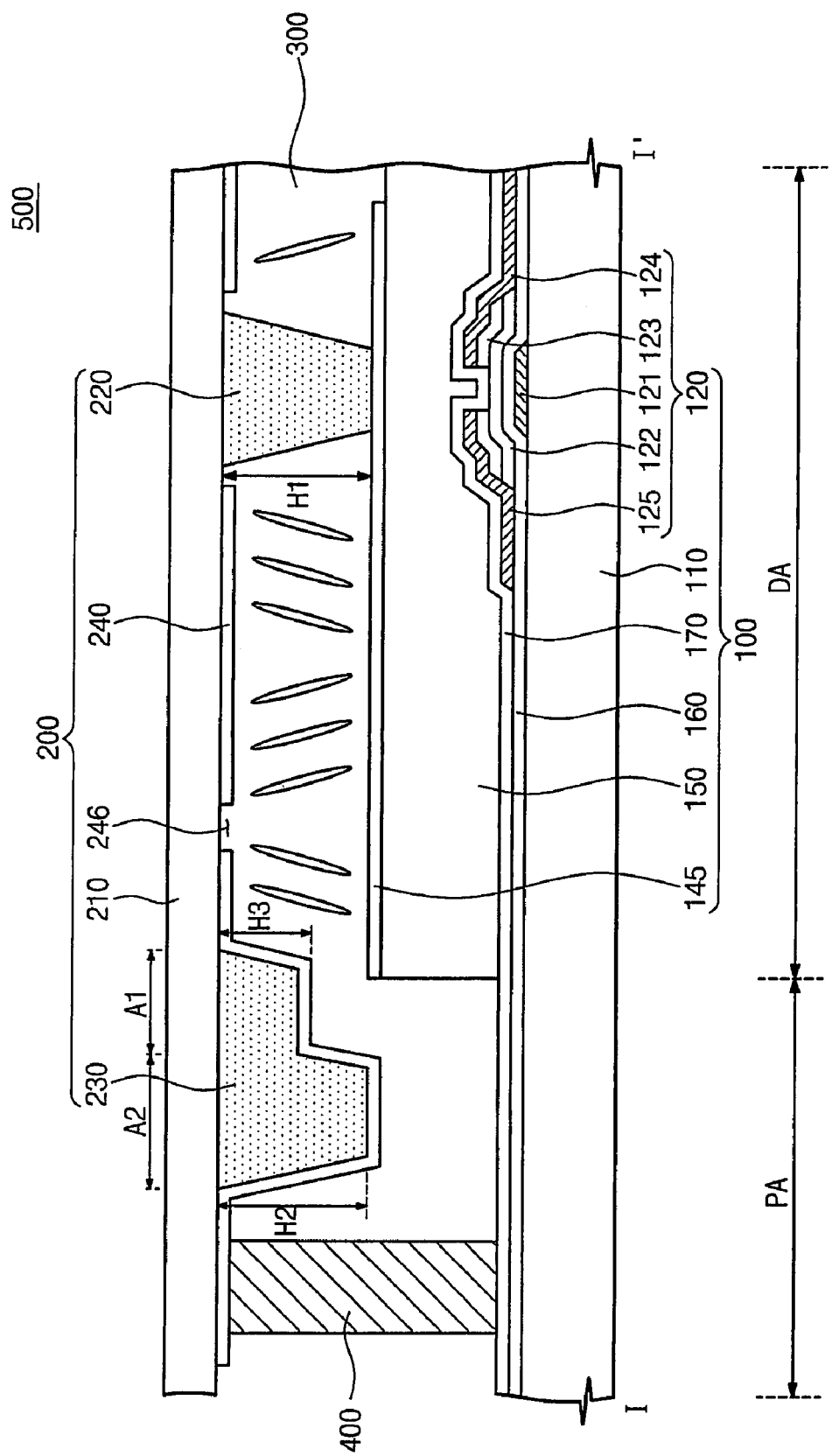
FIG. 2 is a cross-sectional schematic diagram view taken along line I-I' illustrated in FIG. 1.
Figure 3:
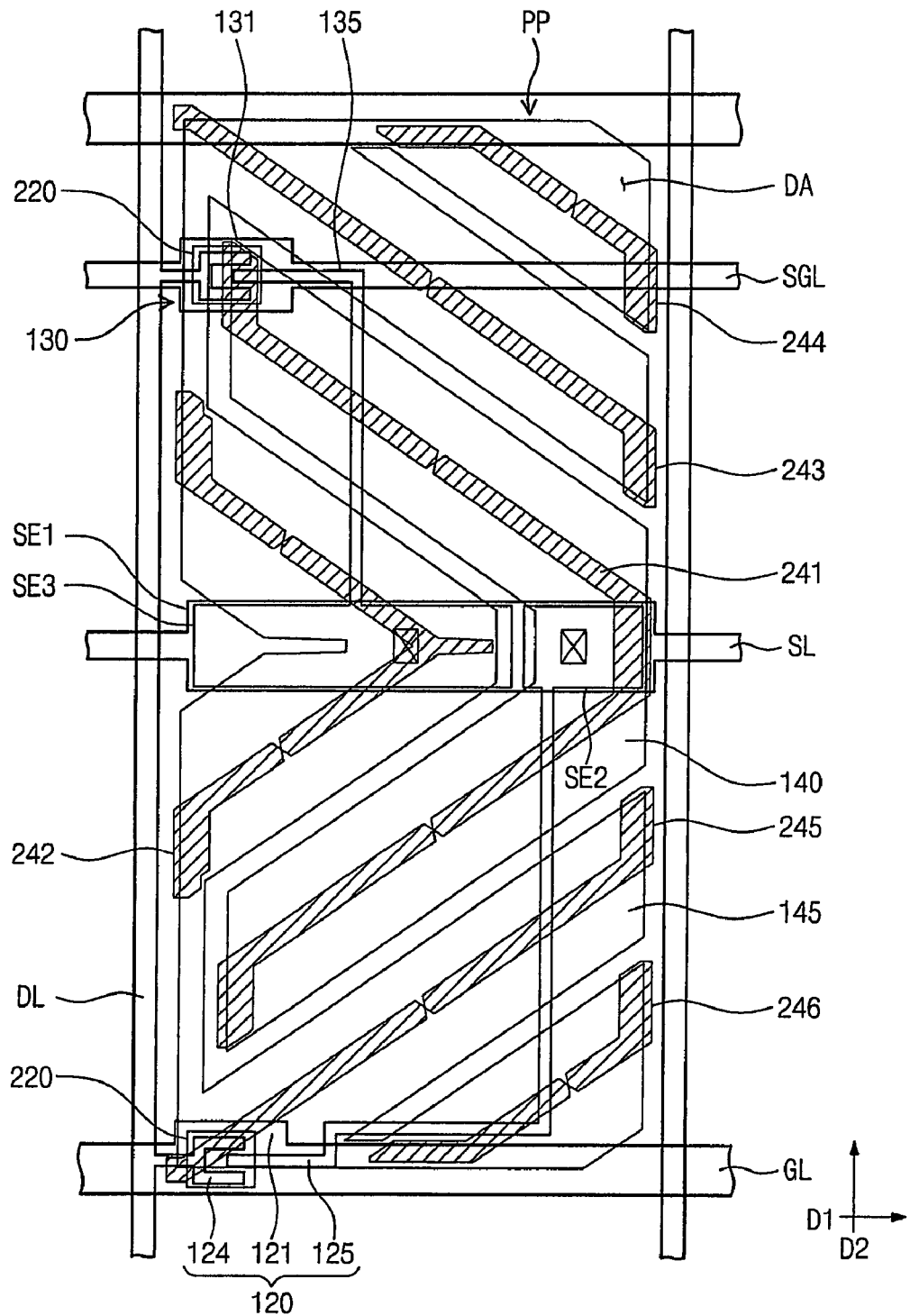
FIG. 3 is an enlarged top plan schematic diagram view illustrating an exemplary embodiment of a display area of the exemplary embodiment of the LCD panel illustrated in FIG. 2.

FIG. 1 is a top plan schematic diagram view illustrating an exemplary embodiment of a liquid crystal display ("LCD") panel 500 according to the present invention, FIG. 2 is a cross-sectional schematic diagram view taken along line I-I' illustrated in FIG. 1 and FIG. 3 is an enlarged top plan schematic diagram view illustrating an exemplary embodiment of a display area DA of the exemplary embodiment of the LCD panel 500 illustrated in FIG. 2.

Referring to FIGS. 1 and 2, an LCD panel 500 includes an array substrate 100, an opposite substrate 200 which faces the array substrate 100 and a liquid crystal layer 300 interposed between the array substrate 100 and the opposite substrate 200.

Referring to FIGS. 2 and 3, the array substrate 100 includes a first base substrate 110, gate lines GL, data lines DL, a pixel part PP and a color filter 150. The first base substrate 110 includes a display area DA to display an image, and a peripheral area PA which surrounds the display area DA. The display area DA and the peripheral area PA are defined on the first base substrate 110. The image is not displayed on the peripheral area PA. The gate lines GL extend over the first base substrate 110 in a first direction D1 in order to transmit a gate signal. The data lines DL extend over the first base substrate 110 in a second direction D2, which is substantially perpendicular to the first direction D1, in order to transmit a data signal. The data lines DL are insulated from the gate lines GL while crossing the gate lines GL. The data lines DL and the gate lines GL divide the display area DA into a plurality of pixel areas.

The array substrate 100 further includes a sub-gate line SGL and a storage line SL which extends over the first base substrate 110 in the first direction D1. The sub-gate line SGL is insulated from the data line DL while crossing the data line DL in order to transmit the gate signal. The sub-gate line SGL crosses the pixel area. The storage line SL is disposed between the sub-gate line SGL and the gate line GL while crossing a central portion of the pixel area, in order to transmit a common voltage, when viewed in a plan view.

The pixel part PP is provided in each pixel area, and the pixel part PP includes first and second thin film transistors ("TFTs") 120 and 130 and first and second pixel electrodes 140 and 145. In the current exemplary embodiment, the pixel part PP includes two TFTs, the first TFT 120 and the second TFT 130, however a number of the TFTs may be reduced or increased according to a driving method of the LCD panel 500.

Since the first TFT 120 and the second TFT 130 include a same structure, hereinafter the structure of only the first TFT 120 will be described in detail in order to avoid redundancy.

The first TFT 120 includes a gate electrode 121 branching from a corresponding gate line of the gate lines GL, an active layer 122 formed on an upper portion of the gate electrode 121, an ohmic contact layer 123 formed on a top surface of the active layer 122, a source electrode 124 formed on a top surface of the ohmic contact layer 123 while branching from a corresponding data line of the data lines DL and a drain electrode 125 formed on a same layer as that of the source electrode 124. In the current exemplary embodiment, a gate electrode 131 of the second TFT 130 branches from the sub-gate line SGL. A central portion of the ohmic contact layer 123 is removed in order to form a channel area which exposes the active layer 122. The source electrode 124 and the drain electrode 125 are spaced apart from each other about the channel area.

The array substrate 100 includes a gate insulating layer 160, which covers the gate line GL, the gate electrodes 121 and 131 and the sub-gate line SGL in the upper portion of the first base substrate 110, and a protective layer 170, which covers the first and second TFTs 120 and 130 in the upper portion of the first base substrate 110.

The color filter 150 is formed on a top surface of the protective layer 170, and the first and second pixel electrodes 140 and 145 are formed on a top surface of the color filter 150. The first pixel electrode 140 is electrically connected to the first TFT 120 to output a first pixel voltage. The second pixel electrode 145 is electrically connected to the second TFT 130 to output a second pixel voltage. In the current exemplary embodiment, the first pixel voltage is larger than the second pixel voltage.

In an exemplary embodiment, the first pixel electrode 140 is inclined with respect to the storage line SL, and the first pixel electrode 140 includes a symmetrical structure about the storage line SL, when viewed in a plan view. The second pixel electrode 145 substantially surrounds the first pixel electrode 140. The second pixel electrode 145 is insulated from the first pixel electrode 140 while being spaced apart from the first pixel electrode 140. When viewed in a plan view, the second pixel electrode 145 includes two openings which are inclined in a same direction as that of the first pixel electrode 140 with respect to the storage line SL, and the two openings are symmetrical to each other with respect to the storage line SL.

The array substrate 100 further includes first, second and third storage electrodes SE1, SE2 and SE3, respectively, which form a storage capacitance. The first storage electrode SE1 branches from the storage line SL, and the first storage electrode SE1 and the storage line SL are provided below the first and second pixel electrodes 140 and 145.

The second storage electrode SE2 extends from the drain electrode 125 of the first TFT 120 and is provided in an upper portion of the first storage electrode SE1, and the second storage electrode SE2 is provided below the first pixel electrode 140. The second storage electrode SE2 is electrically connected to the first pixel electrode 140, such that a first storage capacitance is formed between the second storage electrode SE2 and the first storage electrode SE1, and the drain electrode 125 of the first TFT 120 is electrically connected to the first pixel electrode 140 through the second storage electrode SE2. The third storage electrode SE3 extends from the drain electrode 135 of the second TFT 130 and is formed in an upper portion of the first storage electrode SE1, and the third storage electrode SE3 is provided below the second pixel electrode 145. The third storage electrode SE3 is electrically connected to the second pixel electrode 145, such that a second storage capacitance is formed between the third storage electrode SE3 and the first storage electrode SE1, and the third storage electrode SE3 is insulated from the second storage electrode SE2. The drain electrode 135 of the second TFT 130 is electrically connected to the second pixel electrode 145 through the third storage electrode SE3.

The color filter 150 is formed in the display area DA, and the color filter 150 includes color pixels to realize predetermined colors using light. In an exemplary embodiment, the color pixels include red, green and blue color pixels, and each color pixel is formed in each pixel area.

In an exemplary embodiment, the array substrate 100 further includes an insulating layer (not shown) is disposed between the color filter 150 the first and second pixel electrodes 140 and 145.

Meanwhile, the opposite substrate 200 includes a second base substrate 210, the first and second black matrices 220 and 230 and a common electrode 240.

In exemplary embodiments, the second base substrate 210 faces the first base substrate 110, and the second base substrate 210 includes a transparent material capable of transmitting light. In an exemplary embodiment, the second base substrate 210 includes an inexpensive soda lime glass.

The first black matrix 220 is formed on a top surface of the second base substrate 210, and is interposed between the second base substrate 210 and the array substrate 100, such that a cell gap between the second base substrate 210 and the array substrate 100 is uniformly maintained.

That is, the first black matrix 220 makes contact with the array substrate 100, and the first black matrix 220 includes a first height H1 which is substantially similar to a distance between the second base substrate 210 and the array substrate 100 in the display area DA. The first black matrix 220 is provided in areas which correspond to areas including the first and second TFTs 120 and 130, to thereby block light incident onto the first and second TFTs 120 and 130 from an upper portion of the opposite substrate 200. In exemplary embodiments, the first black matrix 220 includes a photoresist organic material including a black color in order to block light, and the first black matrix 220 prevents light from being incident into the channel areas of the first and second TFTs 120 and 130. In the current exemplary embodiment, two thin TFTs 120 and 130 are provided in the pixel area, thereby requiring two first black matrices 220 to be provided in the pixel area. However, in exemplary embodiments, a number of the first black matrices 220 provided in the pixel area is identical to a number of the TFTs provided in the pixel area.

Referring now to FIGS. 1 and 2, the second black matrix 230 is formed on a top surface of the second base substrate 210 corresponding to the peripheral area PA, and the second black matrix 230 substantially surrounds the color filter 150 when viewed in a plan view. That is, the second black matrix 230 includes a first area A1 which surrounds the color filter 150 and a second area A2 which surrounds the first area A1, when viewed in a plan view. The first area A1 of the second black matrix 230 is provided in a region which includes a portion of the display area DA and a portion of the peripheral area PA, and the second area A2 of the second black matrix 230 is provided in a region corresponding to the peripheral area PA.

The second black matrix 230 is spaced apart from the array substrate 100 by a predetermined distance, and the first and second areas A1 and A2 of the second black matrix 230 include different heights H3 and H2, respectively. In exemplary embodiments, the first area A1 of the second black matrix 230 includes the third height H3 which is smaller than the first height H1, and the second area A2 includes the second height H2 which is substantially similar to the first height H1 of the first black matrix 220. In the current exemplary embodiment, since the first area A1 of the second black matrix 230 includes the third height H3 which is smaller than the distance between the second base substrate 210 and the color filter 150, a space is formed between the second black matrix 230 and the color filter 150 even though the first area A1 of the second black matrix 230 partially overlaps with the color filter 150, when viewed in a plan view.

In addition, since the color filter 150 is not formed in the peripheral area PA, a thickness of the array substrate 100 in the display area DA is smaller than a thickness of the array substrate 100 in the peripheral area PA. Accordingly, even if the second area A2 of the second black matrix 230 includes a second height H2 which is larger than a third height H3, a space is formed between the second black matrix 230 and the array substrate 100.

Since the first and second black matrices 220 and 230 uniformly maintain the distance between the array substrate 100 and the second base substrate 210 while blocking light, the LCD panel 500 does not require an additional spacer. Accordingly, the LCD panel 500 may reduce a number of required process steps which thereby reduces manufacturing costs thereof and also improves a productivity thereof.

In addition, since the color filter 150 is formed on the array substrate 100, the opposite substrate 200 does not require an overcoat layer for planarization. Accordingly, the opposite substrate 200 is not subject to thermal processes used to form the overcoat layer, the color filter 150 and the spacer. Thus, since the opposite substrate 200 may employ a substrate including an inexpensive soda lime glass as the second base substrate 120, in exemplary embodiments, the manufacturing costs thereof may be reduced.

Further, since the height H3 of the second black matrix 230 in the first area A1 is smaller than the height H2 of the second black matrix 230 in the second area A2, a space is formed between the array substrate 100 and the second black matrix 230. Accordingly, when the liquid crystal layer 300 is formed, a flow of the liquid crystal which is disposed into the display area DA is impeded from entering into the peripheral area PA.

Referring now to FIGS. 2 and 3, the common electrode 240 is formed on the upper portion of the second base substrate 210 on which the first and second black matrices 220 and 230 are formed. The common electrode 240 is formed on all areas of the upper portion of the second base substrate except for areas including the first black matrix 220, and the common electrode 240 covers the second black matrix 230. The common electrode 240 is partially removed in areas which correspond to the pixel area, thereby forming first to sixth openings 241 to 246. In exemplary embodiments, the first opening 241 is formed in the upper portion of the first pixel electrode 140 and includes a V shape, the center or central portion of the first opening 241 is bent in the second direction D2. The first opening 241 divides the area of the first pixel electrode 140 into four domains in cooperation with the first pixel electrode 140.

The second opening 242 is formed to correspond to the area including the second pixel electrode 145. The second opening 242 includes a V shape, the central portion of which is bent in the first direction D1, and the second opening 242 is provided substantially in parallel to the first opening 241. The third and fourth openings 243 and 244 are formed to correspond to the area of the second pixel electrode 145. The third and fourth openings 243 and 244 are inclined with respect to the storage line SL, and are disposed substantially in parallel to at least one lateral side of the first pixel electrode 140, when viewed in a plan view. The fifth and sixth openings 245 and 246 are inclined with respect to the storage line SL, and the fifth and sixth openings 245 and 246 are substantially symmetrical to the third and fourth openings 243 and 244, respectively, about the storage line SL, when viewed in a plan view. The second to sixth openings 242 to 246 divide the area of the second pixel electrode 145 into 12 domains in cooperation with the second pixel electrode 145.

The liquid crystal layer 300 interposed between the array substrate 100 and the opposite substrate 200 is aligned in various directions according to the domains. The liquid crystal layer 300 displays an image by adjusting a transmittance of light incident from the array substrate 100 according to an intensity of an electric field generated between the array substrate 100 and the opposite substrate 200.

Referring to FIGS. 1 and 2, a sealant 400 is interposed between the array substrate 100 and the opposite substrate 200, and the sealant 400 is formed in the peripheral area PA. An upper face of the sealant 400 makes contact with the common electrode 240, and a bottom face of the sealant 400 makes contact with the protective layer 170. The sealant 400 couples the array substrate 100 to the opposite substrate 200, and the liquid crystal layer 300 is thereby sealed between the array substrate 100 and the opposite substrate 200. The sealant 400 is cured in the process of coupling the array substrate 100 to the opposite substrate 200. In this case, if the sealant 400 makes contact with the liquid crystal layer 300 in a state in which the sealant 400 is not completely cured, the liquid crystal layer 300 may become contaminated due to a chemical reaction between the sealant 400 and the liquid crystal layer 300.

Therefore, in order to prevent the contamination of the liquid crystal layer 300, the second black matrix 230 is formed with irregular heights in order to delay a flow rate of the liquid crystal layer 300 toward the sealant 400 from the display area DA, thereby preventing or substantially reducing the liquid crystal layer 300 from being contaminated. In other words, the sealant 400 is provided outside of the second black matrix 200, and the sealant 400 substantially surrounds the second black matrix 200 when viewed in a plan view. The first area A1 of the second black matrix 230 is spaced apart from the array substrate 100, thereby forming a passage which would enable the liquid crystal of the display area DA to flow to the peripheral area PA. However, the second area A2 is formed thicker than the first area A1 in order to delay the flow rate of the liquid crystal of the display area DA into the peripheral area PA. Thus, in exemplary embodiments, the second black matrix 230 may prevent or substantially reduce the liquid crystal layer 300 from being contaminated, prevent a display quality from being degraded and improve a yield rate of the product.

Figure 4:
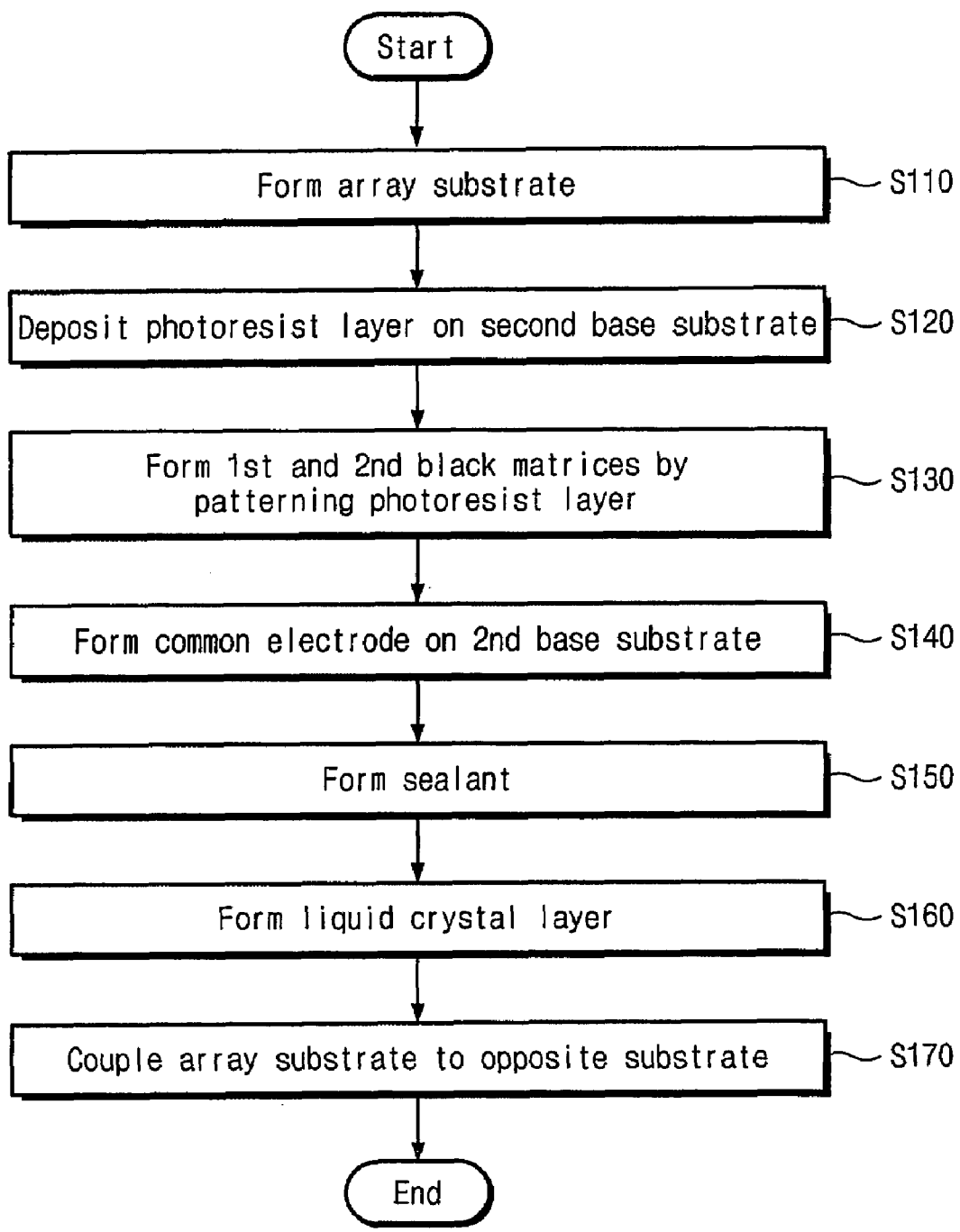
FIG. 4 is a flowchart illustrating an exemplary embodiment of a method of fabricating an LCD panel according to the present invention.

FIG. 4 is a flowchart illustrating an exemplary embodiment of a method of fabricating an LCD panel 500 according to the present invention. FIGS. 5A to 5B are cross-sectional views illustrating a process of fabricating the first and second black matrices 220 and 230, as illustrated in FIG. 2.

Referring now to FIGS. 2 and 4, the pixel areas, the color filter 150, the gate insulating layer 160 and the protective layer 170 are formed on the first base substrate 110, thereby completely forming the array substrate 100 (S110).

Referring to now FIGS. 4 and 5A, after depositing a photoresist layer 610 including a black color on the top surface of the second base substrate 210 (S120), the photoresist layer 610 is patterned, thereby forming the first and second black matrices 220 and 230 (see FIG. 2) (S130).

In exemplary embodiments, a mask 620 is provided in the upper portion of the photoresist layer 610 while being spaced apart from the photoresist layer 610. The mask 610 includes a blocking part 621 to block an ultraviolet ("UV") ray, a transmission part 622 to transmit the UV ray and a slit part 623 to transmit the UV ray in a shape of a slit. In the current exemplary embodiment, the photoresist layer 610 includes a positive-type photoresist, in which a portion exposed to the UV ray is etched, however, in alternative exemplary embodiments, the photoresist layer 610 may include a negative-type photoresist, in which a portion not exposed to the UV ray is etched.

Referring now to FIGS. 5A and 5B, the UV ray is irradiated toward the photoresist layer 610 from the upper portion of the mask 620, thereby patterning the photoresist layer 610. A portion of the photoresist layer 610 corresponding to the transmission part 622 is removed, and a portion of the photoresist layer 610 corresponding to the slit part 623 is partially removed. Accordingly, the first black matrix 220 and the second area A2 of the second black matrix 230 are formed in an area of the second base substrate 210 corresponding to the blocking part 621, and the first area A1 of the second black matrix 230 is formed in an area of the second base substrate 210 corresponding to the slit part 623.

Referring to now FIGS. 2 and 4, the common electrode 240 is formed in the upper portion of the second base substrate 210, thereby forming the opposite substrate 200 (S140).

The sealant 400 is formed on the opposite substrate 200 (S160), and the liquid crystals are dropped into an area of the opposite substrate 200 corresponding to the display area DA, thereby forming the liquid crystal layer 300 (S160). In the current exemplary embodiment, although the liquid crystal layer 300 and the sealant 400 are formed on the opposite substrate 200, the liquid crystal layer 300 and the sealant 400 may be formed on the array substrate 100 in alternative exemplary embodiments.

According to the above, the color filter 150 is formed on the array substrate 100, and the first and second black matrices 220 and 230 are formed on the opposite substrate 200, such that an interval between the array substrate 100 and the second base substrate 200 is uniformly maintained. Thus, since the liquid crystal panel 500 does not require the additional spacer, process steps and manufacturing costs thereof may be reduced, and a productivity thereof may also be improved.

In addition, since a height of the second black matrix 230 adjacent to the sealant 400 is irregular, a spread speed of the liquid crystal layer 300 toward the peripheral area PA is delayed. Therefore, contamination of the liquid crystal layer 300 by the sealant 400 may be prevented or substantially reduced, such that a degradation of a display quality may be prevented or substantially reduced and a yield rate of the product may also be improved.

In addition, since the second base substrate 210 is formed only with the first and second black matrices 220 and 230 and the common electrode 240, a thermal process of forming the opposite substrate 200 is thereby reduced. Thus, a substrate including an inexpensive soda lime glass may be employed as the second base substrate 210, thereby further reducing manufacturing costs thereof.

Although some exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A display panel comprising:
   an opposite substrate; and
   an array substrate;
   wherein, the opposite substrate and the array substrate having a display area and a peripheral area surrounding the display area;
   a first black matrix interposed between the opposite substrate and the array substrate, the first black matrix maintains an interval between the opposite substrate and the array substrate, and the first black matrix is disposed to correspond to the display area to block a light; and
   a second black matrix disposed to correspond to the peripheral area to block the light, the second black matrix comprising a first area and a second area, the second area surrounds the first area, the second area including a height different from a height of the first area when viewed in a plan view, the first area and the second area are defined on the second black matrix.

2. The display panel of claim 1, wherein the first area of the second black matrix includes a first height, the second area of the second black matrix includes a second height larger than the first height.

3. The display panel of claim 2, wherein the first height is smaller than a distance between the array substrate and the opposite substrate.

4. The display panel of claim 3, wherein the first black matrix includes the second height of the second black matrix, and the first black matrix makes contact with the array substrate.

5. The display panel of claim 1, wherein the opposite substrate further comprises a common electrode which is disposed in an upper portion of the opposite substrate except for an area where the first black matrix is disposed to output a common voltage.

6. The display panel of claim 1, wherein the first area of the second black matrix partially overlaps with the color filter when viewed in a plan view.

7. The display panel of claim 6, wherein the color filter is disposed to correspond to the display area, and the second black matrix is spaced apart from the array substrate.

8. The display panel of claim 1, wherein the array substrate further comprises a color filter and a pixel electrode.

9. The display panel of claim 8, wherein the array substrate further comprises an insulating layer is disposed between the pixel electrode and the color filter.

10. The display panel of claim 8, wherein the first black matrix partially overlap a source electrode of the thin film transistor and a drain electrode of the thin film transistor when viewed in a plan view.

11. The display panel of claim 8, wherein the array substrate further comprises a thin film transistor including a gate electrode, a source electrode, and a drain electrode, and the first black matrix is disposed to correspond to an area including the thin film transistor.

12. The display panel of claim 1, further comprising:
    a liquid crystal layer interposed between the array substrate and the opposite substrate, the liquid crystal layer adjusts a transmittance of light according to an intensity of an electric field generated between the array substrate and the opposite substrate; and
    a coupling member interposed between the array substrate and the opposite substrate while surrounding the liquid crystal layer, the coupling member seals the liquid crystal layer.

13. The display panel of claim 12, wherein the coupling member is disposed in the peripheral area to surround the second black matrix and the coupling member is spaced apart from the second black matrix.

14. The display panel of claim 1, wherein the first and second black matrices comprise a photoresist organic material including a black color, and the first and second black matrices are formed substantially simultaneously through a same process.

15. The display panel of claim 1, wherein the opposite substrate includes a soda lime glass.

16. A display panel comprising:
an opposite substrate; and
an array substrate;
wherein the opposite substrate and the array substrate having a display area and a peripheral area surrounding the display area;
a black matrix disposed to correspond to the peripheral area to block the light, the black matrix surrounds the color filter, and the black matrix having a staircase shape.

17. The display panel of claim 16, wherein the black matrix comprises a first area and a second area, the first area surrounds the color filter and the second area surrounds the first area when viewed in a plan view, the first area includes a first height, the second area includes a second height larger than the first height, and the first height is smaller than a distance between the array substrate and the opposite substrate.

18. The display panel of claim 17, wherein the opposite substrate further comprises a spacer interposed between the opposite substrate and the array substrate, the spacer maintains an interval between the opposite substrate and the array substrate, and the spacer is disposed to correspond to the display area to block a light.

19. The display panel of claim 18, wherein the spacer and the black matrix comprise a photoresist organic material including a black color, and the spacer and the black matrix are formed substantially simultaneously through a same process.

* * * * *